United States Patent [19]

de Jong et al.

[11] Patent Number: 4,489,047
[45] Date of Patent: Dec. 18, 1984

[54] PROCESS FOR REMOVING HYDROGEN SULPHIDE FROM PROCESS GASES USING SOLID ACCEPTORS, PROCESS FOR CYCLIC REGENERATING THE USED ACCEPTORS AT HIGH TEMPERATURE, AS WELL AS PROCESS FOR PREPARING ACCEPTORS, WHICH ARE SUITABLE FOR THIS PROCESS

[75] Inventors: Willem A. de Jong, The Hague; Berend J. van der Linde, Delfgauw, both of Netherlands

[73] Assignee: Nederlandse Centrale Organisatie voor Toegepast-Natuurwetenschappelijk Onderzoek, The Hague, Netherlands

[21] Appl. No.: 437,623

[22] Filed: Oct. 29, 1982

[30] Foreign Application Priority Data

Oct. 30, 1981 [NL] Netherlands .......................... 8104924
Dec. 18, 1981 [NL] Netherlands .......................... 8105728

[51] Int. Cl.³ ............................................. B01D 53/34
[52] U.S. Cl. .................................... 423/230; 423/231; 423/563; 502/53; 502/55; 502/517

[58] Field of Search ............... 423/210, 230, 231, 563; 252/189, 191, 411 S, 471; 502/38, 51, 52, 55, 53, 517

[56] References Cited

U.S. PATENT DOCUMENTS

| 2,950,229 | 8/1960 | Batchelor et al. | 423/576 X |
| 4,008,174 | 2/1977 | Jacobson et.al. | 252/411 |
| 4,233,276 | 11/1980 | D'Souza et al. | 423/563 X |
| 4,273,748 | 6/1981 | Takahashi et al. | 423/230 |
| 4,273,749 | 6/1981 | Kimura et al. | 423/231 |
| 4,283,374 | 8/1981 | Erickson | 423/230 |

FOREIGN PATENT DOCUMENTS

| 2738383 | 3/1978 | Fed. Rep. of Germany . |
| 120806 | 5/1966 | Netherlands . |
| 7507102 | 6/1975 | Netherlands . |

*Primary Examiner*—Earl C. Thomas
*Attorney, Agent, or Firm*—Brumbaugh, Graves, Donohue & Raymond

[57] ABSTRACT

An acceptor of $MnO_x$ or iron oxide, wherein x has a value of from 1 to 1.5, supported on a ($\gamma$)-alumina carrier which may contain silica, is used to remove hydrogen sulfide from process gases. The acceptor is regenerated with steam in a reducing atmosphere at a temperature of from 300° C. to 700° C.

15 Claims, No Drawings

PROCESS FOR REMOVING HYDROGEN SULPHIDE FROM PROCESS GASES USING SOLID ACCEPTORS, PROCESS FOR CYCLIC REGENERATING THE USED ACCEPTORS AT HIGH TEMPERATURE, AS WELL AS PROCESS FOR PREPARING ACCEPTORS, WHICH ARE SUITABLE FOR THIS PROCESS

The present invention relates to a process for removing hydrogen sulphide from process gases using solid acceptors, a process for cyclic regenerating the used acceptors at high temperature, as well as a process for preparing acceptors, which are suitable for this process.

Such a process is known from the German Offenlegungsschrift No. 2,738,383, where a granular desulphurisation agent for desulphurising hot reducing gases is described, which may consist of an intimate mixture of finely divided manganese oxide and finely divided non-reactive alumina. The porous granules, obtained by heating the granulated mixture, are used as such. According to this process the used granules are regenerated in an oxidizing atmosphere and then re-used for desulphurisation in the hot reducing gases. In the desulphurisation a temperature of 500°–1300° C., preferably about 700°–1000° C. is used. In the regeneration a temperature of about 500°–1300° C. at preferably about 850°–1150° C. is used.

Preferably a composition is used, which contains about 75% by weight and about 25% by weight manganese oxide non-reactive alumina. After regeneration, the granules can be re-used at least six times without considerable loss of activity. The product gas obtained in this process contains a rather high content of hydrogen sulphide (example I 500 ppm, whereas the contents of hydrogen sulphide reported in the table, are rather high too).

Also from U.S. Pat. No. 2,950,229 a process is known for absorbing hydrogen sulphide on a solid acceptor. The solid acceptor consists of manganese oxide, supported on an inert carrier. Suitable carriers include silica, alumina and a mixture thereof, preferably in the form of mullite. In the description of this U.S. patent it is said that repeated use of manganese oxide supported on silica, alumina, silica-alumina carriers leads to a deactivation of the acceptor. To avoid deactivation the acceptor is regenerated by oxidising the manganese sulphide with oxygen at a temperature above about 643° C., at which a small portion of the acceptor is intimately contacted with an excess of oxygen at a temperature of about 560°–810° C.

The removal of sulphur from process gases is important because otherwise these gases would enter the atmosphere and cause pollution of the environment.

It is difficult to avoid the formation of hydrogen sulphide in partial combustion processes, that is combustion with less than the stoichiometric amount of oxygen, because all fossil fuels, such as natural gas, petroleum and pit coal contain organically bound sulphur. Examples are:
  gasification of pit coal to a gas which may be combusted in turbines according to the combined cycle power generation.
  partial combustion of e.g. fuel oil is CO/H₂ mixtures which are used at the H₂-preparation.

Generally, the gasification and partial combustion products are liberated at higher temperatures, particularly above 500° C. The subsequent processes require again high temperatures, but also a low content of sulphur of their feed. Using combined cycle processes in gas turbines the content of sulphur is preferably lower than 100 ppm, whereas at the H₂-preparation the gas may contain at most 1 ppm sulphur. This means that the sulphur has to be removed by acceptors, if possible at high temperature.

There is a large need of acceptors which remove hydrogen sulphide.

from process gases with a reducing activity that is in which $H_2$ and/or $CO-CO_2$ mixtures are present, and which contain some water
  and further lower the concentration of the hydrogen sulphide from 1 to 100 ppm
  are active at 300°–800° C., preferably about 550° C.
  with reactions which proceed fast, so that small quantities of acceptor are sufficient
  yield the absorbed sulphur in an attractive form by regeneration
  and withstand a large number of acceptation-regeneration cycles without losing their activity.

The first four requirements can be realized on an industrial scale by metal oxides such as ZnO and FeO; however, they cannot be regenerated (economically) and can consequently remove only relatively small quantities of sulphur.

If only the need of the use at high temperature is omitted, the remaining five requirements are met by washing with liquids, absorbing selectively or not, which absorb $H_2S$ at lower temperatures. With amine-solutions frequently a temperature of about 50° C. is used. The disadvantage of this way of processing is that the gaseous stream, which has to be cleaned, has to be cooled down and heated up over a large region of temperatures, thus requiring a comprehensive heat exchange. Further, undesired condensation can occur during the cooling down.

In principle, a large number of metal can be considered for use at high temperature to absorb hydrogen sulphide according to the equilibrium $MeO + H_2S \rightleftarrows MeS + H_2O$. Co, Cu, Fe, Mn, Ni, W, V and Zn are mentioned.

In principle, the regeneration of the obtained metal sulphides can occur in different ways:
  by oxidation:

$$\text{e.g. } MeS + O_2 \rightarrow MeO_x + SO_y$$

A disadvantage of this operation is that the oxidation is strongly exothermic, due to which it is difficult to have an optimum proceeding and control of the regeneration. Further, the variation of temperature between acceptation and regeneration can be undesirable for the apparatus and detrimental to the acceptor. Moreover, the reduction of $MeO_x$ to $MeO$ costs a lot of hydrogen.
  by means of steam:

$$MeS + H_2O \rightarrow MeO + H_2S$$

This is exactly the opposite of the acceptation reaction. As the equilibrium at the acceptation temperature is on the other side, it is clear that using steam (and pure metal sulphides, respectively oxides) the regeneration has to proceed under very different conditions. Of course, this is not practical and consequently undesirable.

Therefore, in practice the regeneration was always effected by oxidation.

According to the present invention it has been found that $MnO_x$, in which x has a value of 1–1.5, preferably 1, or iron oxide on ($\gamma$)-alumina, which—if desired—may contain silica, are excellently suited for the removal of hydrogen sulphide from process gases and besides can be regenerated excellently with steam.

It was already known that a number of metal oxides can also be used as acceptors for hydrogen sulphide if they are supported on a carrier such as ($\gamma$)-alumina, silica or molecular sieves. It is surprising, however, that according to the present invention the combination of metal oxide-carrier according to the invention can be used as an accept-and in the same region of temperatures also be regenerated with steam. Up to now, a good regeneration was problematic and as far as regeneration took place, this was always a regeneration by oxidation.

With the process according to the invention it is possible to use manganese oxide on alumina to catch hydrogen sulphide at a temperature of 300°–750° C., preferably at 400°–575° C.

It is possible to convert $MnO_x$ on ($\gamma$)-alumina to 70% in sulphide, while a complete regeneration with steam is possible. A suitable temperature for this is e.g. 550° C.

The combination according to the invention retains a hardly changed capacity over many dozens of cyles.

The combination according to the invention removes hydrogen sulphide from process gases to a very large extent. E.g. $MnO_x$ on ($\gamma$)-alumina removes hydrogen sulphide at 475° C. from a gas which contains hydrogen and 10 vol. % steam to a residual content of less than 0.1 ppm. In case no steam is present even more sulphur is removed.

The process according to the invention is the more surprising as $MnO_x$ as such or supported on silica solely or molecular sieves is not active in the sense that as far as the hydrogen sulphide is absorbed, a regeneration with steam is not possible.

Also iron oxide is a suitable acceptor. FeO on ($\gamma$)-alumina can be converted to more than 70% in sulphide at 550° C., while just as well a complete regeneration with steam is possible at the same temperature.

A suitable content of metal for the acceptor is 2–20 wt. %, in particular 7–10 wt. %.

If it is desired to counteract the decomposition of hydrogen sulphide in the elements the reactions have to be effected in the presence of sufficient hydrogen.

With the reaction according to the invention the content of water amounts to at most 35 vol. %, preferably, however, not more than 10 vol. %. The bond of hydrogen sulphide to the acceptor decreases when the water content is too high.

Preferably the reactions according to the invention are effected at 400°–575° C., since at lower temperature the conversion decreases.

An advantage of the process according to the invention is that the content of carbon dioxide of the feed has no influence on the acceptation or regeneration.

The carrier to be used can have small as well as large pores since both are active.

Tests

Into a solid bed reactor, in which a quantity of acceptor was present, a gas consisting of 1–2 vol. % $H_2S$, 10 vol. % $H_2$ and the remaining $N_2$, viz. 600 Nvol gas/vol acceptor per hour was introduced. Regeneration took place (always at the same temperature as the acceptation) with 50 vol. % steam, 40 vol. % $N_2$ and 10 vol. % $H_2$. The space velocity was 600–3600 Nvol/vol. h. Hereby the gas stream was passed in the same direction, although passage in the opposite direction is also possible.

The emerging gas was passed through a $CdSO_4$-solution in water. When $H_2S$, is introduced $H_2SO_4$ and the very insoluble CdS are formed. By adding NaOH the pH is kept constant; the added quantity of NaOH yields the cumulative quantity of entered $H_2S$. This continuous method was instrumentised in such a way that the added quantity of NaOH could be registered directly on a recording tape.

Low concentrations of $H_2S$ were estimated by using Dräger-indicator tubes.

|  | T, °C. | % by wt. in acc. | S absorbed mmol/g acc. | % conv. accept.[1] | S regenerated mmol/G |
|---|---|---|---|---|---|
| $MnO_x$/$\gamma$-alumina | 550 | 8.1 | 0.83–1.00 | 60–70 | to 1.00 |
| $FeO_x$/$\gamma$-alumina | 550 | 6.8 | 0.85–1.09 | 87–109 | to 1.10 |
| CuO/$\gamma$-alumina | 550 | 2.6 | not determ.[2] | — | <0.03 |
| $MnO_x$, without a carrier | 550 | 77.5 | 14.0 | 98 | <0.03 |

1. Conversion = MnS/(Mn+MnS)
2. Cu already in S-form before acceptation

From the above it appears that cupric oxide on alumina is not suited as acceptor, because a regeneration withsteam is not possible. Manganese oxide is only possible on a carrier because without carrier no sufficient regeneration occurs. Iron oxide on alumina is suitable as well.

The influence of the carrier on the absorption and regeneration is illustrated with the tests below, which have been effected using $MnO_x$ as active material at a temperature of 550° C., but repeating the regeneration cycle several times.

Influence of way of preparation (alumina carrier) (tests at 550° C.)

Used:
A. impregnation: high temperature and low pressure (impregnation with Mn-solution in water)
B. precipitation by dry-freezing
C. precipitation by adding ethanol
D. precipitation by adding ammonia
E. three times repeated impregnation, followed by heating at low temperature
F. impregnation twice, as above
G. precipitation of manganese hydroxide with NaOH

| Method | % by wt. | acceptation of S mmol/g | % conversion | regeneration on mmol/g |
|---|---|---|---|---|
| A | 8.6 | 1.12 | 69 | 1.12 |
| B | 8.5 | 1.93 | 125 | 1.93 |
| C | 8.5 | 1.10 | 70 | 1.10 |
| D | 8.0 | 0.95 | 66 | 0.95 |
| E | 8.1 | 1.00 | 70 | 1.00 |
| F | 2.0 | 0.33 | 87 | 0.33 |

-continued

| Method | % by wt. | acceptation of S mmol/g | % conversion | regeneration on mmol/g |
|---|---|---|---|---|
| G | 1.9 | 0.30 | 80 | 0.30 |

In a number of cases it was found that after 1 cycle the capacity had receded; in subsequent cycles the capacity remained constant. E.g. at A and E a constant capacity was measured, also in the second cycle.

It can be concluded that the way of preparation certainly has an influence on the capacity; however, always the accepted quantity of S is found again after a second cycle. The values given for the capacity are mean values over five cycles.

Influence of the temperature

| acceptor 1: | 6.8% by weight Fe in the form of iron oxide on alumina. |
|---|---|
| acceptor 2: | $MnO_x/\gamma$-alumina (8.1% by weight Mn) |

| acceptor 1 temperature | acceptation data S, mmol/g | conversion, % | regeneration S, mmol/g |
|---|---|---|---|
| 550 | 0.99 | about 98 | 0.99 |
| 475 | 0.60 | about 50 | 0.60 |
| 404 | 0.40 | about 30 | 0.40 |

| acceptor 2 cycle numbers | T, °C. | accept. data (mean values over 10 cycles) S, mmol/g | conversion, % | |
|---|---|---|---|---|
| 1–10 | 400 | 0.44 | 31 | in all cases |
| 11–20 | 550 | 0.90 | 63 | the regeneration was complete |
| 21–30 | 475 | 0.57 | 40 | |
| 31–40 | 404 | 0.44 | 31 | |
| 41 and 42 | 550 | 0.90+ | 63+ | |

+mean values over 2 cycles

After 75 cycles the activity was still completely unchanged, so the acceptor shows a good stability.

Influence of content of the feed acceptor: $MnO_x$ on $\gamma$-$Al_2O_3$ (3% by weight Mn)

| Temperature (°C.) | content $CO_2$ (vol. %) | acceptation (mmol/g) | regeneration (mmol/g) |
|---|---|---|---|
| 340 | 0 | 0.04 | 0.04 |
| 340 | 22 | 0.04 | 0.04 |
| 600 | 0 | 0.15 | 0.15 |
| 600 | 18 | 0.17 | 0.17 |

From this it appears that the content of $CO_2$ has no influence on the acceptation or regeneration.

Influence of $H_2O$ content of the feed at different temperatures

| acceptor | Temp. (°C.) | Content $H_2O$ (vol. %) | Content $CO_2$ (vol. %) | acceptation (mmol/g) | regeneration (mmol/g) |
|---|---|---|---|---|---|
| 3 | 340 | 0 | 0 | 0.04 | 0.04 |
| 3 | 340 | 0 | 22 | 0.04 | 0.04 |
| 3 | 340 | 2.8 | 21 | 0.04 | 0.04 |
| 3 | 340 | 13 | 19 | 0.01 | 0.01 |
| 3 | 600 | 0 | 0 | 0.15 | 0.15 |
| 3 | 600 | 2.9 | 0 | 0.07 | 0.07 |
| 4 | 700 | 0 | 0 | 0.45 | 0.45 |
| 4 | 690 | 2.8 | 0 | 0.17 | 0.17 |

From this it appears that $H_2O$ reduces the quantity of $H_2S$ to be accepted.

Influence of the type of the carrier

| acceptor | temp. (°C.) | acceptation (mmol/g) | regeneration (mmol/g) | conversion Mn at acceptation (%) |
|---|---|---|---|---|
| 5 | 550 | 1.00 | 1.00 | 70 |
| 6 | 550 | 0.44 | 0.44 | 75 |
| 7 | 550 | 0.10 | 0.03 | unknown |
| 8 | 550 | 0.50 | 0.03 | unknown |
| 9 | 550 | 14 | 0.00 | 98 |
| 10 | 600 | 0.57 | 0.01 | 34 |
| 11 | 590 | 0.01 | 0.01 | 1 |
| 12 | 590 | 0.10 | 0.04 | 12 |

| acceptor | description |
|---|---|
| 5 | $MnO_x$ on $\gamma$-$Al_2O_3$ (7.9% by weight Mn), pore diameter <1000 nm |
| 6 | $MnO_x$ on $\gamma$-$Al_2O_3$ (3.2% by weight Mn), pore diameter 40,000 nm |
| 7 | $MnO_x$ on silica gel (about 5% by weight Mn) |
| 8 | $MnO_x$ on molecular sieves 5A (less than 10% by weight Mn) |
| 9 | pure MnO without carrier |
| 10 | $MnO_x$ on $SiO_2$ (9.0% by weight Mn) |
| 11 | $MnO_x$ on $SiO_2$—$Al_2O_3$ (Ketjen) (5.0% by weight Mn) |
| 12 | mechanic mixture (1:1) of acceptor 10 and $\gamma$-$Al_2O_3$ |

Conclusion:

The $\gamma$-alumina is an important factor; large pores as well as small pores are acceptable. The acceptor preparation can show another optimum depending on the pore size; in the two above cases the same way of preparation is used. Adding $\gamma$-$Al_2O_3$ to $MnO_x$ on silica results in a better proceeding of the regeneration.

Depth of the desulphurization

| acceptor | temp. (°C.) | $H_2S$ content feed (vol. %) | $H_2O$ content acceptation feed (vol. %) | $H_2S$ content product gas during the first 10 min. (ppmvol) |
|---|---|---|---|---|
| 13 | 475 | 1 | 10 | less than 1 |
| 13 | 400 | 1 | 0 | less than 1 |
| 13 | 550 | 1 | 0 | less than 1 |
| 14 | 700 | 1 | 0 | less than 1 |
| 14 | 690 | 1 | 2.8 | less than 5 | acceptor 13 is $MnO_x$ on $\gamma$-$Al_2O_3$ (8.1% by weight Mn)
acceptor 14 is $MnO_x$ on $\gamma$-$Al_2O_3$ (7.2% by weight Mn)

Influence of T and % water in acceptation gas on the reaction rate

| (first order reaction) acceptor 13 experiment | $K_r$(min$^{-1}$) | T, °C. | water content, vol. % | capacity mmol S/ml bed |
|---|---|---|---|---|
| a | 673 | 400 | 0 | 0.19 |
| b | 927 | 475 | 0 | 0.23 |
| c | 1109 | 550 | 0 | 0.38 |
| d | 455 | 475 | 2 | 0.15 |
| e | 446 | 475 | 5 | 0.11 |
| f | 666 | 475 | 10 | 0.09 |

Conclusion:

Water retards the reaction and reduces the capacity. Lowering T from 550 to 475° C. results in an important reduction of the reaction rate.

We claim:

1. A regenerative method for removing hydrogen sulphide from process gases which comprises:
   (a) contacting said gases with an $MnO_x$ or iron oxide acceptor, wherein x has a value of from 1 to 1.5, and wherein said acceptor is supported on a (γ)-alumina carrier, and (b) regenerating the acceptor by contacting the acceptor with steam at a temperature of from 300° C. to 700° C., wherein said steam contains hydrogen.

2. A method according to claim 1 wherein said carrier contains silica.

3. A method according to claim 1 wherein said acceptor is MnO.

4. A method according to claim 2 wherein said acceptor is MnO.

5. A method according to claim 1 wherein 2-20 percent of said acceptor is Mn or Fe or a combination thereof.

6. A method according to claim 2 wherein 2-20 percent of said acceptor is Mn or Fe or a combination thereof.

7. A method according to claim 1 wherein 7-10 percent of said acceptor is Mn or Fe or a combination thereof.

8. A method according to claim 2 wherein 7-10 percent of said acceptor is Mn or Fe or a combination thereof.

9. A method according to claim 1 wherein conditions for said removal include a temperature of from 300° C. to 750° C.

10. A method according to claim 2 wherein conditions for said removal include a temperature of from 300° C. to 750° C.

11. A method according to claim 1 wherein conditions for said removal include a temperature of from 400° C. to 475° C.

12. A method according to claim 2 wherein conditions for said removal include a temperature of from 400° C. to 475° C.

13. A method according to claim 1 wherein water is present and comprises up to 10 percent of the volume of a container in which said method is performed.

14. A method according to claim 2 wherein water is present and comprises up to 10 percent of the volume of a container in which said method is performed.

15. A method according to claim 1 wherein said steam is present at a temperature of from 400° C. to 575° C.

* * * * *

UNITED STATES PATENT AND TRADEMARK OFFICE
CERTIFICATE OF CORRECTION

PATENT NO. : 4,489,047
DATED : December 18, 1984
INVENTOR(S) : De Jong et al.

It is certified that error appears in the above-identified patent and that said Letters Patent is hereby corrected as shown below:

Col. 1, lines 30-31, "and about 25% by weight manganese oxide" should read --manganese oxide and about 25% by weight--;

Col. 1, line 58, "fossile" should read --fossil--;

Col. 4, line 38, "withsteam" should read --with steam--;

Col. 5, following line 52, insert: --acceptor 3: $MnO_x$ on $\gamma$-$Al_2O_3$ (3.0% by weight Mn)-- --acceptor 4: $MnO_x$ on $\gamma$-$Al_2O_3$ (7.2% by weight Mn)--.

Signed and Sealed this

Twenty-seventh Day of August 1985

[SEAL]

Attest:

DONALD J. QUIGG

Attesting Officer

Acting Commissioner of Patents and Trademarks